(12) United States Patent
Lieske et al.

(10) Patent No.: US 7,624,092 B2
(45) Date of Patent: Nov. 24, 2009

(54) CONCEPT-BASED CONTENT ARCHITECTURE

(75) Inventors: Christian Lieske, Wiesloch (DE); Hartwig Seifert, Elchesheim-Illingen (DE); Nikhil Dhairyawan, Eppelheim (DE); Venkatakrishnan Srinivasan, Speyer (DE); Andreas Hirche, Leutershausen (DE)

(73) Assignee: SAP Aktiengesellschaft, Walldorf (DE)

( * ) Notice: Subject to any disclaimer, the term of this patent is extended or adjusted under 35 U.S.C. 154(b) by 458 days.

(21) Appl. No.: 10/993,630

(22) Filed: Nov. 19, 2004

(65) Prior Publication Data
US 2006/0112065 A1 May 25, 2006

(51) Int. Cl.
*G06F 17/30* (2006.01)
(52) U.S. Cl. .................................. 707/1; 707/3; 707/100
(58) Field of Classification Search .................. None
See application file for complete search history.

(56) References Cited

U.S. PATENT DOCUMENTS

| | | | |
|---|---|---|---|
| 5,946,688 A * | 8/1999 | Roberts ........................ | 707/10 |
| 6,088,651 A * | 7/2000 | Nageswaran ................ | 701/208 |
| 6,134,552 A | 10/2000 | Fritz et al. | |
| 6,430,563 B1 | 8/2002 | Fritz et al. | |
| 6,460,034 B1 * | 10/2002 | Wical ............................ | 707/5 |
| 6,959,416 B2 * | 10/2005 | Manning et al. ............. | 715/513 |
| 7,287,217 B2 * | 10/2007 | Kuznetsov et al. ........... | 715/235 |
| 2004/0237044 A1 * | 11/2004 | Travieso et al. .............. | 715/530 |
| 2005/0022106 A1 * | 1/2005 | Kawai et al. ................. | 715/500 |
| 2005/0044495 A1 * | 2/2005 | Lee et al. ..................... | 715/533 |
| 2006/0074858 A1 * | 4/2006 | Etzold et al. ................. | 707/3 |

FOREIGN PATENT DOCUMENTS

WO    WO-99/18522    4/1999

\* cited by examiner

*Primary Examiner*—Don Wong
*Assistant Examiner*—Belinda Xue
(74) *Attorney, Agent, or Firm*—Fish & Richardson P.C.

(57) ABSTRACT

Methods and apparatus, including computer program products, for the identification of data elements. A user input is received, comprising a data element and a context in which the data element is being used. The user input is sent to a terminology database. A list of entries is received, each entry having a first unique identifier (UID) and a second UID. The first represents a concept associated with the data element, and the second represents a specific description of the concept associated with the data element. A user input is received selecting an entry. The UIDs corresponding to the selected entry are directly associated with the data set. In some implementations, directly associating the UIDs with the data set comprises generating markup code comprising the UIDs. The invention lays the groundwork for a more efficient solution for the features/requirements related to versioning, updating, and translation in the realm of hypertexts.

15 Claims, 2 Drawing Sheets

US 7,624,092 B2

CONCEPT-BASED CONTENT ARCHITECTURE

BACKGROUND

The present invention relates to information management.

Currently, most information that is presented to the users of an information system is assembled from smaller pieces of information or content. These smaller pieces of information tend to evolve as the information is updated or otherwise modified to reflect changes that tend to occur over a period of time. Further, these smaller pieces of information are frequently available, or must be made available, in a number of different versions (e.g., to represent the information in different languages).

Typically, in order to keep track of such changes, specific references, such as hyperlinks between hypertext markup language (HTML) pages, are used to link the smaller pieces of information. By linking the smaller pieces of information, larger sets of information can be presented to the user. Although this enables the smaller pieces of information to be linked into meaningful content, this system can be cumbersome when the smaller pieces of information must be updated. In addition, presentations of information in alternate languages are frequently performed by merely applying a word-by-word translation from the source language into a target language. Such a translation is less than ideal, as a single term can often have different translations, depending on the context in which the term is used.

SUMMARY OF THE INVENTION

The present invention provides methods and apparatus, including computer program products, implementing techniques for the identification of data elements and the context in which the data element is being used.

In one aspect, the techniques include receiving a first user input comprising a data element in a data set and a context in which the data element is being used, and sending the first user input to a terminology database. The techniques also include receiving a list of entries from the terminology database based on the first user input, each entry having a corresponding first unique identifier (UID) and a second, distinct UID, wherein the first UID represents a concept associated with the data element, and the second UID represents a specific description of the concept associated with the data element. The techniques further include receiving a second user input selecting a selected entry from the list of entries, and directly associating the first UID and the second UID corresponding to the selected entry with the data set.

Implementations of the invention can include one or more of the following features. Directly associating the first UID and the second UID with the data set may comprise generating markup code comprising the first UID and the second UID. The markup code may be in an extensible markup language (XML) format. The markup code may include attributes attached to the data element that specify the first UID and the second UID. The first UID and the second UID may be linked to the terminology database.

In another aspect, the techniques include receiving a data set comprising of a data element, a first UID associated with the data element, and a second, distinct UID associated with the data element, wherein the first UID represents a concept associated with the data element, and the second UID represents a first description of the concept associated with the data element; and using the first UID to search for information related to the concept associated with the data element.

Implementations of the invention can include one or more of the following features. Information related to the concept may comprise a second, distinct description of the concept. The first description may be in a first language and the second, distinct description may be in a second, distinct language. The information related to the concept may comprise a second data element. The techniques may further comprise receiving a link, wherein the link points to a specific target data element and the link contains both the first UID and the second UID of the target data element, and verifying the link by matching the second UID contained in the link to the second UID associated with the specific target data element. The second UID may identify a specific revision of the data element.

In another aspect, the techniques include receiving a user input comprising a data element in a data set. The techniques further include receiving a first UID and a second, distinct UID, wherein the first UID represents a concept associated with the data element, and the second UID represents a specific description of the concept associated with the data element. The techniques also include directly associating the first UID and the second UID with the data set, wherein directly associating the first UID and the second UID with the data set comprises generating markup code comprising the first UID and the second UID. The techniques may further include using the first UID to search for information related to the concept associated with the data element.

The techniques can be implemented to realize one or more of the following advantages. Small pieces of information content can be cataloged consistently. The small pieces of information can be identified without requiring constant access to databases that manage these small pieces of information. The small pieces of information can be reused between different pieces of information content. The techniques provide support for localization, maintenance, and quality assurance tasks.

The techniques can be used to translate terms in documents in a manner that captures the nuances of certain words or phrases. The techniques provides the ability to implement a more efficient solution for the features and requirements related to versioning, updating, and translation in the realm of hypertexts.

One implementation of the invention provides all of the above advantages.

These general and specific aspects can be implemented using a computer program, a method, a system or apparatus, or any combination of computer programs, methods, or systems. Details of one or more embodiments of the invention are set forth in the accompanying drawings and in the description below. Other features, objects, and advantages of the invention will be apparent from the description, the drawings, and the claims.

BRIEF DESCRIPTION OF THE DRAWINGS

Like reference numbers and designations in the various drawings indicate like elements.

DETAILED DESCRIPTION

Figure 1:
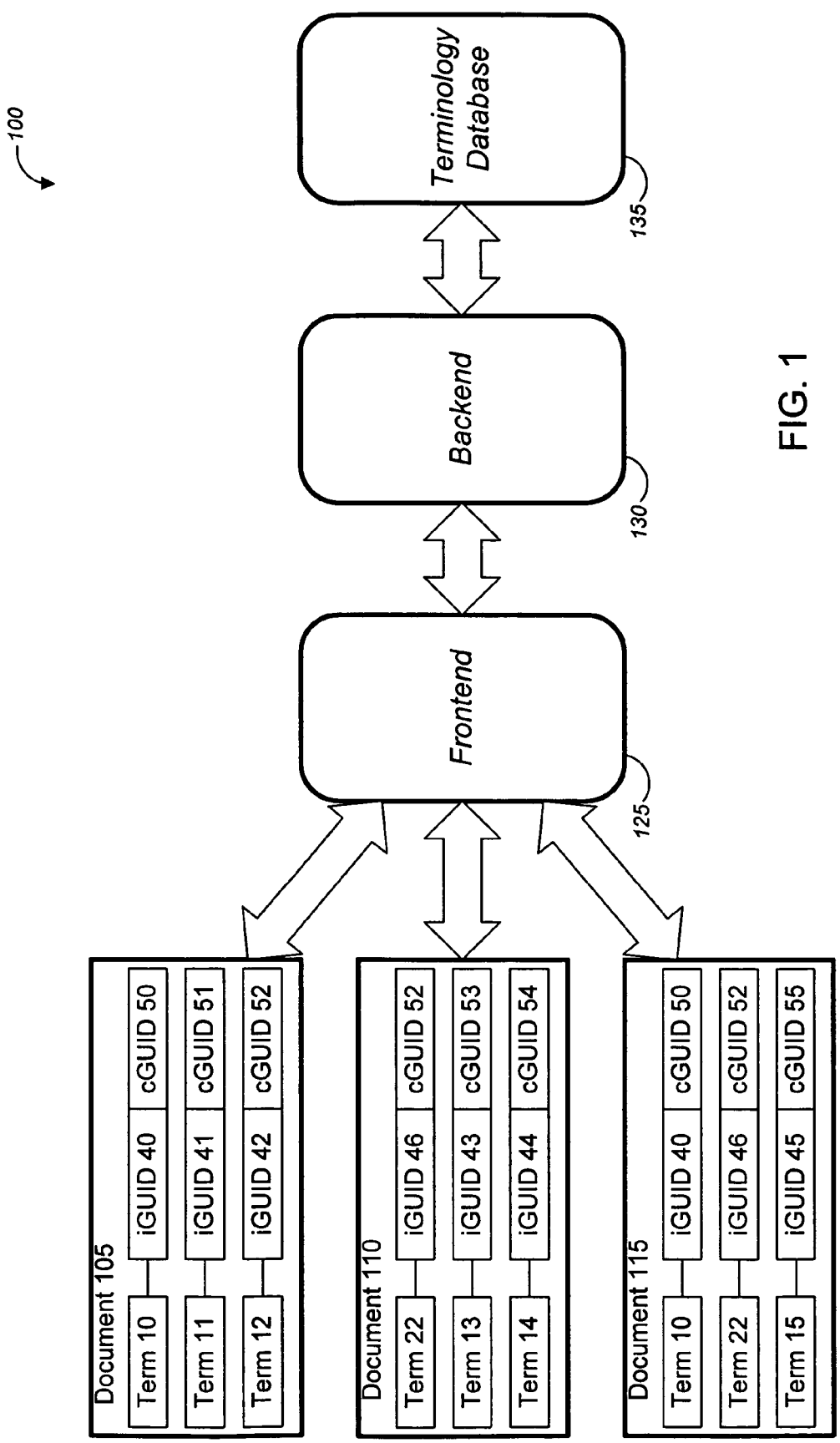
FIG. 1 illustrates a concept-based content architecture system.

FIG. 1 shows a concept-based content architecture system 100 that associates unique identifiers with data elements in data sets. The content architecture system contains a frontend system 125, a backend system 130, and a terminology repository or database 135.

In one implementation, the frontend system 125 can be the Knowledge Workbench from SAP AG of Walldorf (Baden), Germany (SAP). The backend system 130 can be the Knowledge Warehouse, also from SAP, and the terminology database 135 can be SAPTerm. The Knowledge Warehouse is a tool that supports various activities related to the creation of software manuals.

A user can access the system 100 by using the frontend system 125. Through the frontend system 125, the user has access to a number of data sets that are contained within the system. A data set is a collection of units of content. Data sets can include text documents, data files, database entries, or any other type of resources that can be stored and accessed through the backend system 130. In one implementation, the data set is an extensible markup language (XML) document. Typically, each of these data sets is comprised of data elements, where each data element represents a unit of content. As each data set can be comprised of multiple data elements, the user can easily create new data sets by combining or rearranging smaller data elements that already exist within the system. The user can also introduce new data elements into the system.

In one implementation, the data sets in the system 100 include multiple text documents (e.g., text documents 105, 110, 115). Each text document is made up of numerous terms, each term being a word or phrase that describes a particular concept. For instance, in the example presented in FIG. 1, document 105 is comprised of three terms 10, 11, 12. Document 110 is also comprised of three terms 22, 13, 14. In this instance, term 22 in document 110 refers to the same concept as term 12 in document 105. Document 115 is comprised of three terms 10, 22, 15.

Figure 2:
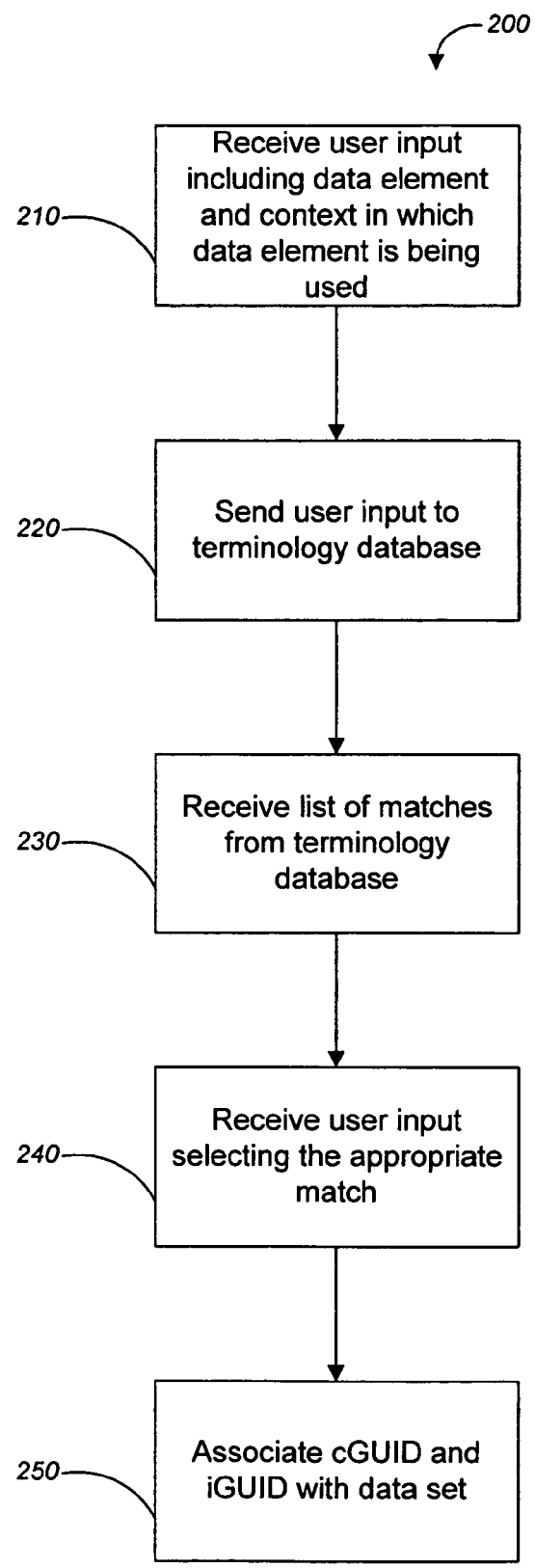
FIG. 2 is a flow chart illustrating the assignment and association of Globally Unique Identifiers (GUIDs) to data sets.

FIG. 2 illustrates an example process 200 in which a user can associate a new or existing data element (e.g., the terms in documents 105, 110, and 115) with concepts so that data elements that describe the same concept can be associated with one another. First, the system receives user input that includes the data element under consideration, as well as the context in which the data element is being used (step 210). A context can include metadata that describes the data set. For example, the context can include the language of the data element and the version of the data element. In one implementation, it is the frontend system 125 that receives this user input from the user.

The system then sends the user input to the terminology database (step 220). In one implementation, the user input that has been received by the frontend system 125 is passed to the backend system 130. The backend system 130 then queries the terminology database 135 with the context information, in order to determine if the specific context has already been created in conjunction with a previous data element.

The system then receives a list of matches from the terminology database (step 230). Based on the query submitted in step 220, the terminology database 135 generates a listing of likely concepts that the data element is referencing. This list is returned to the backend system 130, which passes the information to the frontend system 125.

Each concept has assigned to it two globally unique identifiers (GUID). The first GUID is known as the concept globally unique identifier (cGUID), and the second GUID is known as the incarnation globally unique identifier (iGUID). The iGUID is unique to each data element, regardless of the context the data element is used in. The cGUID is shared by all data elements that refer to the same concept.

The system receives user input selecting the appropriate match from the list of matches (step 240). The user can view the list of matches that the terminology database 135 generated, in order to select the concept that correlates with the selected data element.

Finally, the system directly associates the cGUID and the iGUID of the data element with the data set (step 250). In one implementation, the GUIDs are directly linked with the data set through the use of markup language. For example, the data set can include markup language, attached to a specific data element, that identifies the iGUID and cGUID of that specific data element. The markup code may be in an extensible markup language (XML) file format. The cGUID and iGUID are linked together in the data set, and are also linked to the terminology database, so that the terminology database maintains a complete record of every concept (uniquely identified by its cGUID), as well as every data element that is associated with each unique concept (each data element being uniquely identified by its iGUID). By linking both the cGUID and iGUID to the specific data element, every data element associated with the concept represented by the cGUID can be identified by the system, without having to separately query the terminology database for each data element.

A given cGUID can be associated with more than one iGUID. For example, in document 105, term 12 is associated with iGUID 42, and cGUID 52. In document 115, term 22 refers to the same concept as term 12. Therefore, term 22 is also associated with cGUID 52. However, as every unique data element receives a unique iGUID, term 22 is associated with iGUID 46, which is a GUID that uniquely identifies that particular data element.

The association of data elements with particular concepts can be used in a variety of situations. For example, as the description or definition of a specific data element changes, the system can identify every location that makes use of the concept and data element, and either automatically or at the users discretion update the existing data sets to reflect the new data element description or definition that more accurately describes the concept. For example, the concept 'operating system' may be defined, and the existing data element associated with 'operating system' is Microsoft Windows 98. With the release of Microsoft Windows XP, the user may wish to update some or all of the data sets that include references to Windows 98 to now include Windows XP. Using the cGUID and iGUID, it is easy to identify every situation which makes reference to the concept of 'operating system,' and generate new documents which reflect the current usage of the data element Windows XP.

Continuing this example, it is possible to have multiple data elements assigned to a single concept. For example, the data element 'OS X' can also be associated with the concept 'operating system.' In this manner, the documents that currently exist containing details about Windows can easily be adapted to reflect use with the Mac OS X, by having the system identify every data set that references the concept 'operating system' by using the cGUID associated with this concept, and then either automatically replace every data element with the data element 'OS X,' or prompting the user as to whether each individual data element should be changed. As the data elements are modified, each new or modified data element is assigned a new iGUID, in order to differentiate the new or modified data element from the older data elements. In this manner, the new data elements can be stored by the system without necessitating the need to overwrite or delete the old data elements.

The iGUID/cGUID relationship can be used to generate other data sets for use in a specific environment or locality.

For example, a bilingual glossary can be created by the system based upon the data elements that are contained in a given selection of data sets. The system uses the iGUIDs and cGUIDs to recognize the concepts that are associated with the given selection of data sets. The system can then identify the data elements contained in the selection of data sets for each concept, as well as the appropriate data elements reflecting each concept in the desired language, and link them in a new data set to contains a bilingual or multilingual glossary.

The ability to associate data elements with concepts, no matter the language that the data element happens to be in, can also provide for enhanced retrieval functionality. A user can enter a search term into the system. Instead of merely looking for matches to the search term entered, and returning the matches to the user, the system can identify possible concepts that the user is attempting to locate. Once these concepts, and their associated cGUIDs, are identified, the system can return matches to the user that include data sets in multiple languages, as well as data sets that are related to what the user was searching for, but do not explicitly contain the search term that the user had originally entered.

The inclusion of both cGUIDs and iGUIDs can aid in the identification of a particular revision of the data set. As the iGUID is unique to each data element, it will always be able to identify the specific version of the data set that is being accessed. As mentioned above, each modification of a particular data element results in the assignment of a new iGUID to that data element. Therefore, it is also possible to reconstruct data sets using older data elements that have since been updated by newer data elements.

The use of cGUIDs and iGUIDs also allows the system to more easily manage references and links between data elements. A link that points to a specific target data element contains both the cGUID and the iGUID of the target data element that the link points to. Therefore, the link is uniquely associated with one specific data element. Further, this structure enables the system to verify that the link is still valid; if the iGUID contained in the link is not the same as the iGUID of the target data element, the system will recognize that a problem exists, and can either attempt to automatically fix the broken link, or alert the user that a broken link exists.

In an additional implementation, the backend system can be the SAP Knowledge Provider. In this instance, the SAP Knowledge Provider works by querying the terminology database, such as SAPTerm, in order to determine if any new iGUIDs exist for a given cGUID. For example, the user may wish to generate a hypertext markup language (HTML) file from an XML file that already exists within the system. When the system is generating the HTML document, the SAP Knowledge Provider can query the terminology database to make sure that every data element for a specified concept (represented by a cGUID) is the most current available, or if there are new data elements (with new iGUIDs) that exist for any given cGUID.

The above-described techniques can be implemented in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments, but other embodiments can be implemented and are within the scope of the following claims. For example, the operations of the invention can be performed in a different order and still achieve desirable results. In certain implementations, multitasking and parallel processing may be preferable. As another example, although the use of UI patterns has been described in connection with business objects and business data, patterns can be used with other types of objects and with data that is not business-related.

What is claimed is:

1. A computer-implemented method comprising:
associating a concept described by a data set of data elements with a concept globally unique identifier (cGUID) to be shared by particular data elements referring to the concept, each data element comprising a unit of content;
associating a first data element that describes the concept with an incarnation globally unique identifier (iGUID);
associating the concept with the first data element, further comprising:
receiving a first user input from a user comprising the first data element, and a context in which the data element is being used and describing a language or version of the first data element,
querying a terminology database using the context, the terminology database containing a record of the concept and the cGUID corresponding to the concept and a record of the data element associated with the concept and the iGUID corresponding to the data element,
receiving a list of likely concept matches for the first data element from the terminology database based on querying the terminology database, the each likely concept match having a corresponding cGUID and iGUID,
receiving a second user input from the user selecting a match from the list of likely concept matches that correlates with the first data element, and
directly associating the cGUID and the iGUID corresponding to the selected match with the data set, further comprising linking the cGUID and the iGUID in the data set and the terminology database;
identifying the cGUID based on receiving a search term associated with the concept, the search term indicating that the user is attempting to locate the concept;
identifying the first data element based on identifying the cGUID;
replacing the first data element with a second data element associated with the concept; and
outputting the data set including the second data element.

2. The method of claim 1, wherein directly associating the cGUID and the iGUID with the data set comprises generating markup code comprising the cGUID and the iGUID.

3. The method of claim 2, wherein the markup code is in an extensible markup language (XML) format.

4. The method of claim 2, wherein the markup code includes attributes attached to the first data element that specify the cGUID and the iGUID.

5. A computer program product, tangibly embodied in a machine-readable storage device, the computer program product being configured to cause data processing apparatus to perform operations comprising:
associating a concept described by a data set of data elements with a concept globally unique identifier (cGUID) to be shared by particular data elements referring to the concept, each data element comprising a unit of content;
associating a first data element that describes the concept with an incarnation globally unique identifier (iGUID);
associating the concept with the first data element, further comprising:
receiving a first user input from a user comprising the first data element, and a context in which the data element is being used and describing a language or version of the first data element,
querying a terminology database using the context, the terminology database containing a record of the concept and the cGUID corresponding to the concept and a record of the data element associated with the concept and the iGUID corresponding to the data element,
receiving a list of likely concept matches for the first data element from the terminology database based on querying the terminology database, the each likely concept match having a corresponding cGUID and iGUID,
receiving a second user input from the user selecting a match from the list of likely concept matches that correlates with the first data element, and
directly associating the cGUID and the iGUID corresponding to the selected match with the data set, further comprising linking the cGUID and the iGUID in the data set and the terminology database;
identifying the cGUID based on receiving a search term associated with the concept, the search term indicating that the user is attempting to locate the concept;
identifying the first data element based on identifying the cGUID;
replacing the first data element with a second data element associated with the concept; and
outputting the data set including the second data element.

6. The computer program product of claim 5, wherein the operation to directly associate the cGUID and the iGUID with the data set comprises generating markup code comprising the cGUID and the iGUID.

7. The computer program product of claim 6, wherein the markup code is in an extensible markup language (XML) format.

8. The computer program product of claim 6, wherein the markup code includes attributes attached to the first data element that specify the cGUID and the iGUID.

9. The method of claim 1, wherein the output data set does not include the search term.

10. The method of claim 1, wherein the search term uses a first language, and wherein the output data set uses a second language.

11. The method of claim 1, wherein the first data element is replaced with the second data element based on the second element describing the concept more accurately than the first data element.

12. The method of claim 1, further comprising:
associating the concept with a second data element; and
differentiating the first and second data elements based on the version of the first and second data elements.

13. The computer program product of claim 5, wherein the output data set does not include the search term.

14. The computer program product of claim 5, wherein the search term uses a first language, and wherein the output data set uses a second language.

15. A device comprising:
a processor configured to:
associate a concept described by a data set of data elements with a concept globally unique identifier (cGUID) to be shared by particular data elements referring to the concept, each data element comprising a unit of content;

associate a first data element that describes the concept with an incarnation globally unique identifier (iGUID);

associate the concept with the first data element by:
- receiving a first user input from a user comprising the first data element, and a context in which the data element is being used and describing a language or version of the first data element,
- querying a terminology database using the context, the terminology database containing a record of the concept and the cGUID corresponding to the concept and a record of the data element associated with the concept and the iGUID corresponding to the data element,
- receiving a list of likely concept matches for the first data element from the terminology database based on querying the terminology database, the each likely concept match having a corresponding cGUID and iGUID,
- receiving a second user input from the user selecting a match from the list of likely concept matches that correlates with the first data element, and
- directly associating the cGUID and the iGUID corresponding to the selected match with the data set, further comprising linking the cGUID and the iGUID in the data set and the terminology database;

identify the cGUID based on receiving a search term associated with the concept, the search term indicating that the user is attempting to locate the concept;

identify the first data element based on identifying the cGUID;

replace the first data element with a second data element associated with the concept; and output the data set including the second data element.

* * * * *

UNITED STATES PATENT AND TRADEMARK OFFICE
CERTIFICATE OF CORRECTION

PATENT NO.      : 7,624,092 B2                                       Page 1 of 1
APPLICATION NO. : 10/993630
DATED           : November 24, 2009
INVENTOR(S)     : Lieske et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 468 days.

Signed and Sealed this

Twenty-sixth Day of October, 2010

David J. Kappos
*Director of the United States Patent and Trademark Office*